United States Patent Office 3,347,788
Patented Oct. 17, 1967

3,347,788
PROCESS FOR THE PREPARATION OF PRODUCTS USED FOR THE CONTROL OF VISCOSITY AND WATER ABSORPTION OF DRILLING FLUIDS
August Wilhelm Sohn, Mannheim, and Albert Erasmus, Mannheim-Waldhof, Germany, assignors to Zellstoff-fabrick Waldhof, Mannheim-Waldhof, Germany, a corporation of Germany
No Drawing. Continuation of application Ser. No. 395,572, Sept. 10, 1964. This application Dec. 20, 1966, Ser. No. 603,391
Claims priority, application Germany, Sept. 24, 1963, Z 10,373
4 Claims. (Cl. 252—8.5)

ABSTRACT OF THE DISCLOSURE

A well drilling fluid comprising a hydratable clay and a pretreated sulfite liquor in aqueous dispersion to control the viscosity and water loss of the drilling fluid. The pretreated sulfite liquor is the product formed by reacting waste sulfite liquor at temperatures between about 50 and 100° C. with chromium III sulfates and a sulfate selected from the group consisting of iron-II and iron-III sulfates and mixtures thereof. The pretreated sulfite liquor product may be dried and pulverized and further reheated to a temperature between 100° and 200° C.

This application is a continuation of application S.N. 395,572, now abandoned.

Prior art

In the drilling of deep wells, as for example oil or gas wells, a drilling fluid or mud is usually used. This fluid, which is pumped down the inside of the drill pipe and returns upward in the annulus between the drill pipe and the hole, serves several purposes. It acts as a cooling medium and lubricant for the drill bit and as medium for the transport of drill cuttings to the surface as well as producing a sealing layer on the wall of the hole. The fluid normally consists of a suspension in water of a swelling or hydratable clay, such as bentonite, together with such clay or finely divided material as may be produced from the soil in the course of drilling. Other materials may also be added, such as weighting materials where high pressures may be encountered, starches and gums to promote the wall sealing properties of the fluid as well as a number of other materials which are used to produce fluids for use under special conditions.

Because of its function in removing the cuttings from the hole it is necessary that the viscosity characteristics of the fluid should fall within a definite range. The viscosity of the fluid should be high enough to support the cuttings in their travel from the drill bit to the surface but should not be so high as to make circulation difficult and develop unduly high pressures in the pumping system. At the same time the gel strength, which develops on standing, should be high enough to prevent settling of the cuttings in the well if circulation should be stopped for any reason but the gel should not develop fast enough to prevent the settling and removal of the cuttings in the mud pit. Further the gel should not develop to a point where difficulties would be encountered on the resumption of pumping.

The required mud characteristics are sometimes obtained with an untreated suspension of sodium bentonite but it is frequently necessary, especially where higher densities are required in the mud to add conditioners or thinners in order to obtain lower viscosities and gel strengths. For this purpose a number of materials are used as for instance certain phosphate compounds as well as quebracho and certain other tannin extracts.

It is well known to use ligninsulfonates as thinning agents in drilling fluids of hydratable, swelling clays. Various salts of the lignin-sulfo-acid have been suggested and various processes of waste sulphite liquor have been employed for the obtaining of such thinners. As a rule, these "thinners" are expected not only to serve to control the viscosity and gel strength, but at the same time to exert a favorable effect on the water absorption of the drilling mud. Regarding the pressure conditions prevailing in the rock structure, the components of the drilling fluid should provide a layer, as impermeable as possible, on the outer wall of the drill hole.

It has been known to use a waste sulfite liquor-product, which forms during the heating of a waste sulfite liquor containing ammonium ions. A lignin sulfonate of this type should reduce the liquid loss in gas- and oil drilling to an effective degree. Other processes were effected by subjecting tahe lignin of the faste sulfite liquor to an oxidation process, for instance with hexavalent chromium compounds, in a strongly acid media. Furthermore, it has been suggested to heat the waste sulfite liquor in aqueous phase to temperatures of about 150 to 200° C., prior to the oxidation.

All of these processes either decrease the possibility of fluid loss, i.e. the loss of filtration water in the drilling mud, or they intensify the thinning effect in the desired manner. However, both effects have not yet been achieved simultaneously to an satisfactory degree, so that difficulties have been repeatedly encountered at levels of extreme depths, especially in drilling in salt deposits.

The invention

It has now been discovered, that the above mentioned effects may be attained simultaneously by the use of the invention. The viscosity control and water absorption of drilling fluids may be obtained by the use of products of hydratable swelling clays such as bentonite, either weighted and/or admixed with salts which incorporate chromium- and iron-compounds. These chromium- and iron-compounds are prepared according to a process wherein waste sulfite liquor, biologically free of the sugars as well as of the biological reaction products, is reacted with chromium-III- and iron-II- and/or iron-III-sulfates at temperatures of between 50 to 100° C., and the amount of the cationic iron in the lignin sulfonate, based on the dry thinning agent to be used, is fixed at not more than 2.7% of $Fe_2O_3$, preferably not more than 2.0% of $Fe_2O_3$.

This type of mixed chromium-iron-lignin sulfonates with the iron content limited to less than 2.7% of $Me_2O_3$ has an excellent thinning effect in salt-free bentonite muds as well as in salt containing and higher alkaline muds, even when these contain calcium sulfate in solution.

In addition to the favorable thinning effect, fluid loss values are obtained, which fully meet the demands required for great depths.

As starting materials for the preparation of the products of the invention, the waste sulfite liquors of calcium bisulfite boilings of deciduous and preferably coniferous woods may be employed. Such waste sulfite liquars are freed by biological means, of the sugars and of the side products being formed. The resulting waste sulfite liquor is reacted as such, or after concentrating the liquor, with chromium-III- and iron-II- or -III-sulfates. To each 100 parts by weight of concentrated waste sulfite liquor with a dry content of 40 to 50%, preferably 45%, 5 to 12, preferably 6 to 9 parts by weight of chromium-III-sulfate, and 0.5 to 3, preferably 1 to 1.5 parts by weight of iron-II- or -III-sulfate are added. The salts are added advantageously undissolved to the waste sulfite liquor. To increase the rate of solution, it has been found advantageous to add the salts to a heated waste sulfite liquor, as for instance obtained from the evaporators and having a temperature of above 50° C. For the purpose of freeing the product to a great extent of calcium ions, according to an especially preferred embodiment of the invention, the addition of sodium sulfate and/or sulfuric acid, for example, has proved of advantage.

After the added salts in the waste sulfite liquor have dissolved, the solution is stirred for some time, until practically all of the calcium is precipitated as calcium sulfate. Thereafter, the calcium sulfate is isolated, for instance by centrifuging, filtration or by extraction with the aid of cyclone separators.

Next, the product is reduced to powder, for example on a roller drier or by a spray-drying process. The powder per se was used directly and it exhibited excellent properties as a thinner for drilling mud, at the same time reducing the filter water value.

For further reduction of the water absorption it was found especially advantageously to subject the dry product in powder form to a heating at a temperature of above 100° C., especially at temperatures of between 140 to 200° C., preferably between 160 to 180° C. The duration of the heating depends to a greater extent on the degree of the temperature selected. For instance, for a product, heated for a period of 30 minutes at a temperature of 180° C. nearly identical hydraulic water values were obtained as for a product heated for 1 hour at 160° C. This heating effects simultaneously a reduction of the sulfur content of the product.

According to another preferred embodiment of the invention, the fluid loss may be reduced, when the reaction of the waste liquor with the chromium- and iron-salts is performed in such a way that in the resulting powdery product a content of at most 2%, preferably about 0.5% of CaO, may be noted. This low calcium content has proven advantageous also for the reheated products.

Aside from the advantages already mentioned in regard to the thinning effect and water filtration properties, the further advantage is to be stressed, that, according to the process of the invention the waste sulfite liquor was not subjected to any oxidation process.

The following specific examples are presented to illustrate the invention and to enable persons skilled in the art to better understand and practice the invention and are not intended to be limitative.

EXAMPLE I 3 kg. of a biologically de-sugarized waste sulfite liquor obtained by the Ca-bisulfite process, and evaporated to a dry content of 45%, were reacted with 190 g. of chromium-II-sulfate, 39 g. of iron-III-sulfate, 100 g. of sodium sulfate and 160 g. of 50% sulfuric acid. The extracted calcium sulfate was centrifuged. Thereafter, the substance was dried on a roller dryer at a temperature of 115° C. maximum. 1.4 kg. of an iron-chromium-lignin sulfonate were obtained, having a $Fe_2O_3$-content of 1.2% and having a $Cr_2O_3$-content of 4.2%. The CaO-value was below 0.2%.

The lignin sulfonate thus obtained was added in an amount of 2% to the following three test drilling solutions which differed in their composition, their initial viscosity and their pH-value:

(1) a 6% bentonite-suspension in water with 0.65% carboxymethyl cellulose,
(2) a neutral mud of the following composition:
20 parts by weight of bentonite; 162 parts by weight of Altwarmbuchen clay; 580 parts by weight of water; 7.5 parts by weight of sodium chloride.
(3) same mud composition as in (2), but with the addition of 2.5 parts by weight of NaOH.

The comparative properties are shown in Table I as follows:

TABLE I

|  | 1 | | 2 | | 3 | |
|---|---|---|---|---|---|---|
|  | (a) | (b) | (a) | (b) | (a) | (b) |
| Fluid loss, ml., API-Norm (Code 29), measured with Fann-Filterpress | 10 | 7.0 | 23 | 17.5 | 26 | 12.5 |
| Filter cake, mm | 1 | 1.0 | 6 | 3.5 | 7 | 1.7 |
| 600 r.p.m. (measured with Fann-VG-Meter) | 73 | 54 | 59 | 34 | 162 | 30 |
| 300 r.p.m | 59 | 36 | 54 | 26 | 161 | 16 |
| 200 r.p.m | 52 | 28 | 49 | 23 | 159 | 11 |
| 100 r.p.m | 45 | 19 | 48 | 20 | 153 | 6 |
| 6 r.p.m | 33 | 6 | 44 | 16 | 137 | 1 |
| 3 r.p.m | 33 | 5 | 44 | 16 | 107 | 1 |
| 10″ gel strength, lbs./100 sq. ft | 29 | 5 | 48 | 23 | 98 | 2 |
| 10′ gel strength, lbs./100 sq. ft | 77 | 35 | 44 | 45 | 121 | 6 |
| Apparent viscosity, cp | 37 | 27 | 30 | 17 | 81 | 15 |
| Plastic viscosity, cp | 14 | 18 | 5 | 8 | 1 | 14 |
| Yield value, lbs./100 sq. ft | 45 | 18 | 49 | 18 | 160 | 2 |

(a) Drilling mud without addition.
(b) Drilling mud with addition of 2% of iron-chrome-lignin-sulfonate according to the invention.

EXAMPLE II

A fermented waste sulfite liquor of Ca-bisulfite boilings of pinewood was reacted, as in Example I, with chromium-III- and iron-III-sulfide. The residual lime content was reduced in steps by adding $Na_2SO_4$ (row A) and $H_2SO_4$ (row B). Liquor samples were taken from the individual steps, and these samples were concentrated and dried at a temperature of 100° C. The chromium content of the sample of the first step was, in (row A) 2.5% of $Cr_2O_3$ and 1.0% of $Fe_2O_3$; in (row B) it amounted to 1.4% of $Cr_2O_3$ and 1.2% of $Fe_2O_3$. The four samples of the steps of (row A), having a calcium content, were tested in an 8% bentonite-mud-solution without further additions in regard to the water absorption (filtration water value) while the four samples of the steps of (row B) were tested in an 8% bentonite-mud-solution containing additional 1% of MaCl and 0.5% of calcium sulfate. The addition of the products for the drilling amounted each time to 2%.

TABLE II

| | | | | |
|---|---|---|---|---|
| Row (A): | | | | |
| Percent CaO in dry substance of ligninsulfonate | 2.2 | 1.5 | 0.9 | 0.25 |
| Fluid loss value, API-Norm in ml | 24.1 | 21.4 | 15.7 | 13.4 |
| Row (B): | | | | |
| Percent CaO in dry substance of ligninsulfonate | 2.2 | 1.5 | 0.9 | 0.25 |
| Fluid loss value, API-Norm in ml | 28.0 | 21.6 | 14.4 | 8.3 |

The effects of the thinners correspond to the values given in Example.

The effects of the thinners correspond to the values given in Example I.

EXAMPLE III

By way of comparison, a chromium-iron-lignin sulfonate, obtained by simple reaction (re-salting) with chromium-III- and iron-III-sulfate, was tested along with an iron-chromium-lignin sulfonate of identical chromium content, which was prepared with hexavalent chromium by the oxidation process as known in the art.

*Description of the preparation and analysis of the two products*

(a) The reaction of the waste sulfite liquor occurred as described in Example I, but with 75 g. of iron-III-sulfate and 180 g. of chromium-III-sulfate.

(b) 1 kg. of waste sulfite liquor (50%) not de-sugared, was admixed with 20 g. of iron-III-sulfate and 70 g. of sodium bichromate; the mixture was then adjusted to pH 2 and after a reactiontime of 30 minutes with NaOH, it was adjusted to pH 3.5. Subsequently, the product was reduced to powder on a roller dryer.

TABLE III

|  | a | b |
|---|---|---|
| Cr$_2$O$_3$, percent | 4.0 | 4.0 |
| Fe$_2$O$_3$ percent | 1.9 | 2.05 |
| CaO, percent | 0.18 | 3.96 |

Analysis of technical application:

TABLE IV

|  | (1) Inventive Product | (2) Oxidation Product | (3) Drilling mud without addition |
|---|---|---|---|
| Fluid loss, ml. (API-Norm) | 8.0 | 12.5 | 11.1 |
| Filter cake, mm | 1.0 | 5.5 | 1.2 |
| Fann: |  |  |  |
| 600 r.p.m | 51 | 88 | 75 |
| 300 r.p.m | 34 | 56 | 60 |
| 200 r.p.m | 27 | 47 | 53 |
| 100 r.p.m | 19 | 38 | 47 |
| 6 r.p.m | 6 | 22 | 34 |
| 3 r.p.m | 5 | 20 | 33 |
| 10″ Gel strength, lbs./100 sq. ft | 8 | 21 | 30 |
| 10′ Gel strength, lbs./100 sq. ft | 47 | 30 | 81 |
| Apparent Viscosity, cp | 26 | 44 | 38 |
| Plastic Viscosity, cp | 17 | 32 | 15 |
| Yield value, lbs./100 sq. ft | 17 | 24 | 45 |

A 6% bentonite-suspension with an addition of 0.65% of carboxymethylcellulose was used as the drilling mud here.

EXAMPLE IV

An iron-chromium-lignin sulfonate with a cation-content of 4.3% of Cr$_2$O$_3$, 1.2% of Fe$_2$O$_3$ and 0.3% of CaO was admixed in an amount of 2% with an 8% bentonite- (Clarsol FB1) suspension without further additions. The fluid loss value of this liquid amounted to 24.9. In comparison, 7 samples of the identical starting product were admixed at the same percentage of the liquid suspension, these samples having previously been subjected to a reheating in increasing measure. The initial sulfur-content (organically bonded sulfur) of the ligninsulfonate amounted to 6.61%. The results are shown in the following table:

TABLE V

| Heating temperature of the powder (degs.) | Sulfur content of the powder (percent) | Fluid loss value after— | |
|---|---|---|---|
|  |  | ½ hour heating (ml.) | 1 hour heating (ml.) |
| 80 | 6.61 | 24.6 |  |
| 100 | 6.58 | 23.3 |  |
| 120 | 6.56 | 23.3 |  |
| 140 | 6.54 | 23.6 | 18.4 |
| 160 | 6.22 | 19.8 | 17.2 |
| 180 | 5.95 | 7.7 | 11.7 |
| 200 | 5.54 | 9.3 | 10.7 |
|  |  |  | 8.0 |

EXAMPLE V

Four chromium-iron-lignin sulfonates were prepared with chromium-contents between 1.5 and 1.8% of Cr$_2$O$_3$, iron-contents of 1.0 to 1.2% of Fe$_2$O$_3$ and descending calcium-contents. Parts of these four pulverized thinners were reheated to 180° C. for a period of 100 minutes. For comparison, the untreated and the treated powders were admixed in an amount of 2% with a pure 8% bentonite mud solution.

TABLE VI

| Content of CaO in lignin-sulfonate, percent | Fluid loss value after— | |
|---|---|---|
|  | API-Norm without reheating | API-Norm with reheating |
| 7.1 | 27.7 | 22.5 |
| 4.4 | 23.8 | 18.5 |
| 1.7 | 19.0 | 10.0 |
| 0.25 | 15.4 | 8.6 |

While certain specific examples and preferred modes of practice of the invention have been set forth it will be understood that this is solely for the purpose of illustration and that various changes and modifications may be made without departing from the spirit of the disclosure and the scope of the appended claims.

We claim:

1. A drilling fluid consisting essentially of a hydratable swelling clay and an amount sufficient to control viscosity and water absorption of a pretreated sulfite liquor in aqueous dispersion, said pretreated sulfite liquor being the product formed by reacting waste sulfite liquor, said liquor being freed of sugars by fermentation, at temperatures of between about 50 and 100° C., with 5 to 12 parts by weight per 100 parts by weight of said liquor of chromium-III sulfates and 0.5 to 3 parts by weight per 100 parts by weight of said liquor of a sulfate selected from the group consisting of iron-II and iron-III sulfates and mixtures of said iron sulfates, the amount of cationic iron in the sulfite liquor product being 1 to 2.7% Fe$_2$O$_3$ based on the dry product, drying and pulverizing said product, and reheating at a temperature between about 100 and 200° C.

2. The drilling fluid of claim 1, wherein the reheating of the pretreated sulfite liquor product is done at a temperature of about 140 to 180° C.

3. The drilling fluid of claim 1 wherein the sulfite liquor product contains less than 2% Fe$_2$O$_3$.

4. The drilling fluid of claim 1 wherein the clay is a bentonite clay.

References Cited

UNITED STATES PATENTS

| 2,858,271 | 10/1958 | Byrd | 252—8.5 |
| 2,935,473 | 5/1960 | King et al. | 252—8.5 |
| 3,035,042 | 5/1962 | Hoyt | 260—124 |

LEON D. ROSDOL, *Primary Examiner.*

HERBERT B. GUYNN, *Examiner.*